June 24, 1969   A. KUHLENKAMP   3,452,184
CONTROL DEVICE FOR ANTI-AIRCRAFT GUNS
Filed Dec. 23, 1965

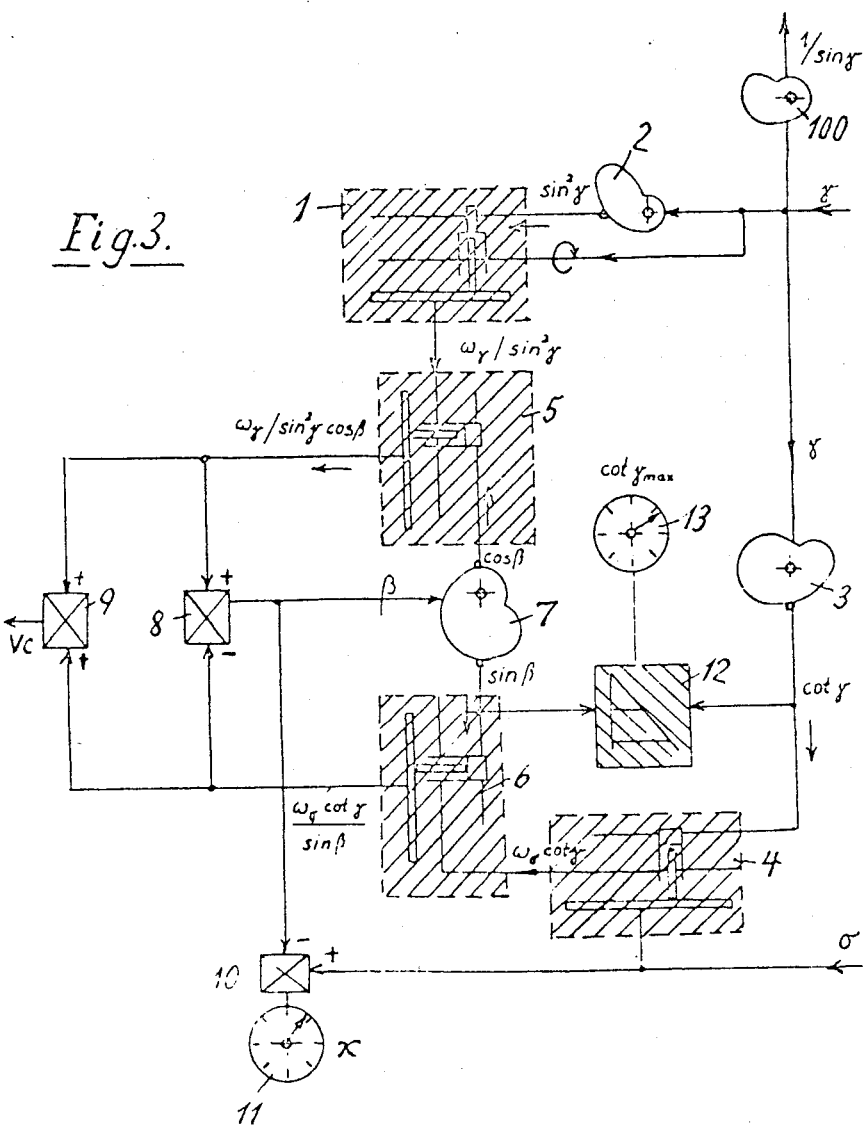

United States Patent Office 3,452,184
Patented June 24, 1969

3,452,184
CONTROL DEVICE FOR ANTI-AIRCRAFT GUNS
Alfred Kuhlenkamp, 42 Maschstrasse,
Braunschweig, Germany
Filed Dec. 28, 1965, Ser. No. 516,995
Claims priority, application Germany, Jan. 2, 1965
K 54,921
Int. Cl. F41g 5/06
U.S. Cl. 235—61.5   4 Claims

ABSTRACT OF THE DISCLOSURE

Apparatus for tracking a moving target utilizing optical elements or weapons without knowledge of the distance of the target from an observation point comprising computer means for determining course angle, target velocity and lateral and elevational angles of the target from signals corresponding to parameters represented on a cotangent plane having a constant height.

---

This invention relates to a control device enabling an operator to track a fast moving target with a sighting device or gun automatically after the initial line of sight has been established, whereby in the case of guns also the lead angle depending on the time of flight of the projectile is taken into account.

Devices of this kind are known which solve the problem for the case that the target range is known.

The device of this invention is of the type which does not depend on the knowledge of the measured target range, and it is, therefore, particularly suitable for tracking the target with gun sights, or for surveying instruments, and for light anti-aircraft. The known devices rely essentially on the geometrical relations which apply to the representation of the target travel on a sphere and in which only angles and angular speeds appear.

In another known device, those mathematical equations are solved which relate to the resolution of the target speed into the components of a Cartesian coordinate system.

The representation of the motion of an aircraft on a sphere has the drawback of requiring a multiple transformation of the coordinate systems. First, the angular values taken for the computation are to be converted from the azimuthal coordinate system into that of the plane of flight; in that system, the extrapolation of the motion must be computed, and the extrapolated values must be again converted from the plane of flight coordinates to the azimuthal coordinates. Said multiple conversions require a correspondingly large array of calculating elements.

A device using said resolution into the components gives values which are rather difficult to visualize and are, therefore, not very suitable for making the necessary corrections. The operator is more familiar with lead angles and target speeds than with speed components; as far as lead angles and target speeds are concerned, he would be better able to judge whether the computed values as to magnitude and time are in accord with the corresponding values of the actual target.

Said difficulties are overcome by the device of the invention which determines the control values by computer means from the laws which apply to the representation of the target path in polar coordinates at an altitude $h_c$ (cotangent plane) assumed to be constant.

Thereby, it is of advantage to represent, the motion of the target, in accordance with nature, in polar coordinates. This has the advantage to avoid the array of computer means required for converting the angular values taken directly from the polar coordinate system of the instrument or gun, into the rectangular coordinates of the computing device, and for reconverting the values extrapolated in the rectangular coordinate system into the polar coordinate system of the instrument or gun.

For a better understanding of the invention, together with further objects thereof, reference is made to the drawings illustrating a preferred embodiment of the control device according to the invention.

In the drawings:

FIGS. 1 and 2 comprise geometrical representations useful in explaining the theory of the invention. FIG. 1 showing the geometrical representation of the cotangent plane, and FIG. 2 showing the speed triangle and the angular relations in the horizontal plane;

FIG. 3 is a diagrammatic representation of the control device for determining the speed in the cotangent plane and the azimuth;

Figure 1:
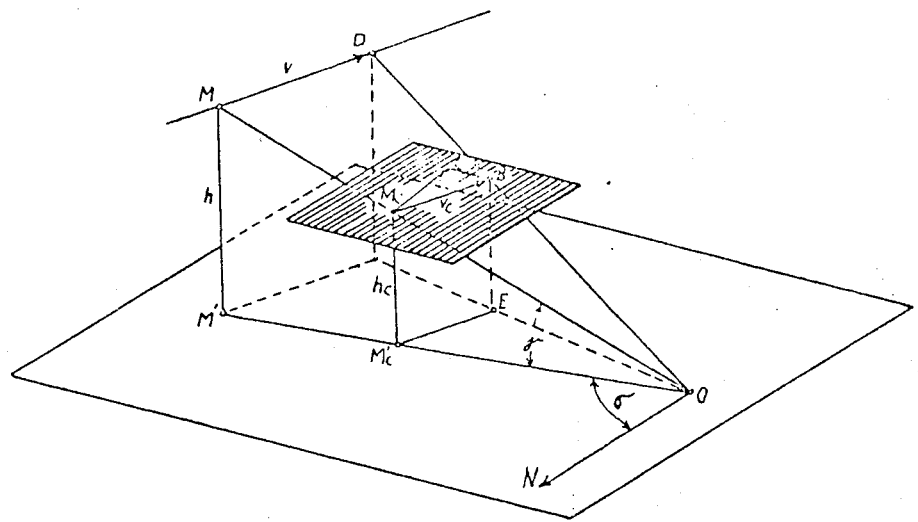

In order to aid in the description of the present invention, the following list of parameters is provided:

$v$=actual speed
$h_c$=altitude of cotangent plane
$h$=actual altitude
$h_c$=altitude of cotangent plane
$\gamma$=angle of elevation
$\kappa$=course angle
$\sigma$=lateral angle
$\beta$=sight angle
$\omega\sigma$=lateral angular velocity
$\omega\gamma$=elevational angular velocity
$\alpha$=superelevation
$h_c \cot \gamma_{max}$=shortest range in cotangent plane The basis of my new control device is the representation, known from firing according to sound, of the flight path in the cotangent plane, i.e. in a plane lying at an altitude $h_c$ parallel to the horizontal plane (FIG. 1). The present position M on the true flight path is represented by the present position $M_c$ in the cotangent plane. Similarly, the speed $v_c = M_cB$ corresponds to the speed $v = MD$. In the horizontal plane, the speed appears as $v_c = M'_cE$, and the horizontal range as $OM_c' = h_c \cot \gamma$, $\gamma$ being the angle of elevation. The target course passing through $M_c'$ is parallel to the target course passing through $M'$ so that the azimuth is the same for both courses while the speeds $$\frac{v_c}{v} = \frac{OM'_c}{OM'} = \frac{h_c \cdot \cot \gamma}{h \cdot \cot \gamma} = \frac{h_c}{h}$$

are in the same relationship as the altitude $h_c$ in the cotangent plane to the true altitude $h$.

Therefore, if a constant altitude $h_c$ is assumed and the flight path is represented as projected from the cotangent plane into the horizontal plane, azimuth $\kappa$ and velocity $v_c$ can be determined.

Said known geometrical relationships are used for the following developments. Conventional sighting means may be utilized to initially sight and track the target, and the angle of elevation $\gamma$, the lateral angle $\sigma$, the elevational angular velocity $\omega\gamma$, and the lateral angular velocity $\omega\sigma$ may be derived from the sighting means by the rotation of wheels and gears, as is conventional.

Figure 2:
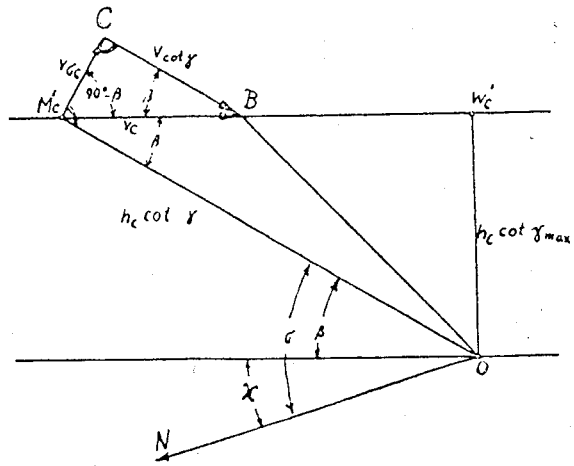

The target speed $v_c$ in the cotangent plane is resolved into the two components $v\delta_c = M'_cC$ and $v_{\cot\gamma} = CB$. We have $$v\delta_c = \omega\delta \cot\gamma \cdot h_c$$

where $\omega\delta$ is the lateral angular velocity in the horizontal plane and $$v_{\cot\gamma} = \frac{1}{\sin^2\gamma} \omega\gamma \cdot h_c$$

wherein $\omega\gamma$ is the vertical angular velocity. The components appear in the same magnitude also in the horizontal plane. FIG. 2 shows the relationships in said plane.

If the sight angle of the target to the observer O is designated with $\beta$, we have between lateral angle $\delta$, course angle $\kappa$, and sight angle $\beta$, the relation $$\kappa = \delta - \beta$$

For a given zero direction (e.g. north) of the lateral angle computation, $\delta$ is known so that $\beta$ determines also the course angle $\kappa$. Between the speed components, we have the relations $$\sin\beta = \frac{v_{\delta c}}{v_c} = \frac{\omega\delta \cot\gamma}{v_c} \cdot h_c$$

$$\cos\beta = \frac{v_{\cot\gamma}}{v_c} = \frac{\omega\gamma}{\sin^2 \cdot v_c} \cdot h_c$$

Said equations give $$v_c = \frac{\omega\delta \cot\gamma}{\sin\beta} = \frac{\omega\gamma}{\sin^2\gamma \cos\beta}$$

This relationship serves to determine the sight angle and the speed $v_c$ in the manner diagrammatically illustrated in FIG. 3.

The angle of elevation $\gamma$ is differentiated in the friction disc drive 1, in which the friction disc is displaced in accordance with the functional value $\sin^2\gamma$ coming from the cam disc 2 so that the functional value $\omega\gamma/\sin^2\gamma$ is formed. The angle of elevation $\gamma$ turns the cam disc 3 formed according to the functional value $\cot\gamma$; the output value of said cam disc 3 goes into the friction disc drive 4 in which the product $\omega\delta \cot\gamma$ is formed with the lateral angle $\delta$. The functional values $\omega\gamma/\sin^2\gamma$ and $\omega\delta \cot\gamma$ serve to determine the speed $v_c$ and the sight angle $\beta$ in the computer group consisting of the two friction disc drives 5 and 6 and the double cam disc 7 for $\sin\beta$ and $\cos\beta$. In said group, the functional values coming from the two drives 5 and 6 are subtracted from each other in the differential 8, and the difference is used for driving the double cam disc 7. Said difference becomes zero when the cam disc 7 is so adjusted to the sight angle $\beta$ that the two functional values coming from the two drives 5 and 6 are equal. They indicate then the target speed $v_c$ which comes out of the differential 9 as the sum of the two functional values.

In the differential 10, the sight angle $\beta$ is subtracted from the lateral angle $\delta$ and furnishes the course angle $\kappa$, which is indicated on the dial 11. As an additional constant which is of advantage for the subsequent computations, the multiplication drive 12 computes from the functional values $\sin\beta$ and $\cot\gamma$ the shortest distance in the cotangent plane (change point distance $OW_c'$) and indicates it on the dial 13.

Target speed $v_c$, course angle $\kappa$, and the shortest range $\cot\gamma_{\max} \cdot h_c$ in the cotangent plane are the input values into the second computer group which furnishes the aiming values for the optical system and the gun.

Figure 4:
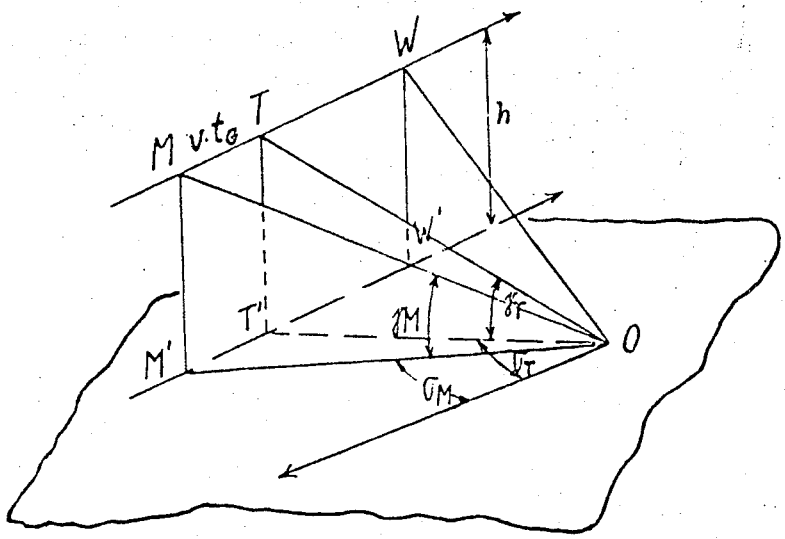
FIG. 4 is the geometrical representation for the present position and the future position of the target.

FIG. 4 explains the geometrical relationships. Points M, T, and W lie on the target path at the altitude $h$, while the corresponding points M', T', and W' lie on the projection in the horizontal plane. Point W is the change point, point M is the present position of the target. The angular values, angle of elevation $\gamma_M$ and lateral angle $\delta_M$ indicate the direction to the target and determine the tracking of the target with the aid of the sighting telescope. The point of impact T indicates the position of the target at the end of the time transit of the projectile. The distance between the present position M and the point of impact equals the distance $s$ traveled by the target with its speed $v$ during the time of transit of the projectile $\delta_G$. The angular values, angle of elevation $\gamma_T$ and azimuth $\delta_T$, indicate, therefore, the direction to the point of impact and govern the tracking of the target with the gun.

Figure 5:
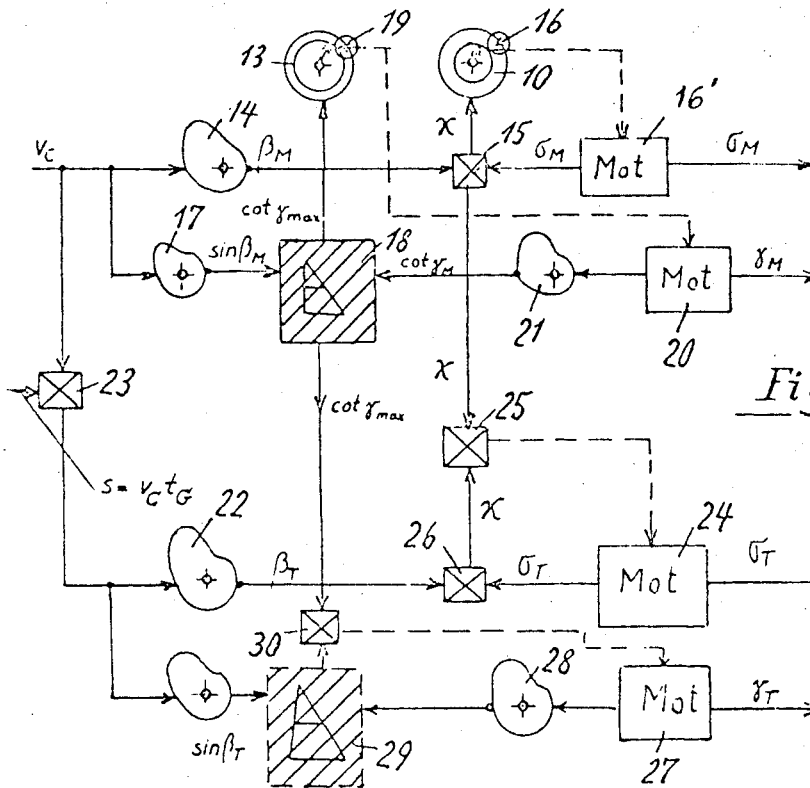
FIG. 5 shows diagrammatically an assembly consisting of computer drives for computing the ultimate position data of the gun or instrument; the upper part of the figure represents the computer group for the present position, and the lower part represents the computer group for the future position of the target.

An example is shown in FIG. 5.

The target speed $v_c$ serves to drive the cam disc 14 which contains the course of the sight angle $\beta$ for the entire flight path. The sight angle $\beta$ comes via the differential 15 on the follower 16 of the indicator device 10 for the constant course angle. The difference between the two pointers controls an electric or hydraulic motor 16' in such a way that the two pointers have always the same position. In this way, the motor turns in accordance with the lateral angle $\delta_M$.

The targe speed $v_c$ serves further to drive the cam disc 17 formed in accordance with the functional value $\sin\beta_M$. The functional value passes through the multiplication drive 18 to the pointer 19 of the indicator 13 for the constant $\cot\gamma_{\max}$. As at the indicator device 10, the difference controls a motor 20 whose number of turns equals the angle of elevation $\gamma_M$ when the product formed with functional value $\cot\gamma_M$ of the cam disc 21 in the multiplication drive 18 agrees with the value $\cot\gamma_{\max}$ of the indicator device 13. Lateral angle $\delta_M$ and angle of elevation $\gamma_M$ are the output values for the present target position and direction of the sighting telescope.

A similarly arranged computer group furnishes the angular values $\delta_T$ and $\gamma_T$ for the point of impact, which values serve for the control of the gun (lower part of FIG. 5). Said group is distinguished from the group for the present target position by rotation of the $\beta$-cam disc 22 with respect to the cam disc 14 by an amount corresponding to the path $v_ct_G$ wherein $t_G$ is the time of transit of the projectile, by superimposing $s$ in the differential 23. The $\delta_T$ computer line comprises again the motor 24, controlled by the differential 25 substituted for the follower pointer arrangement 16, and the totalizing drive 26 for $\kappa = \delta - \beta$. The $\gamma_T$-computer line comprises motor 72, cot-drive 28, multiplicator 29 for $\sin\beta \cdot \cot\gamma$, and the comparator device 30 for controlling the motor 27.

Figure 6:
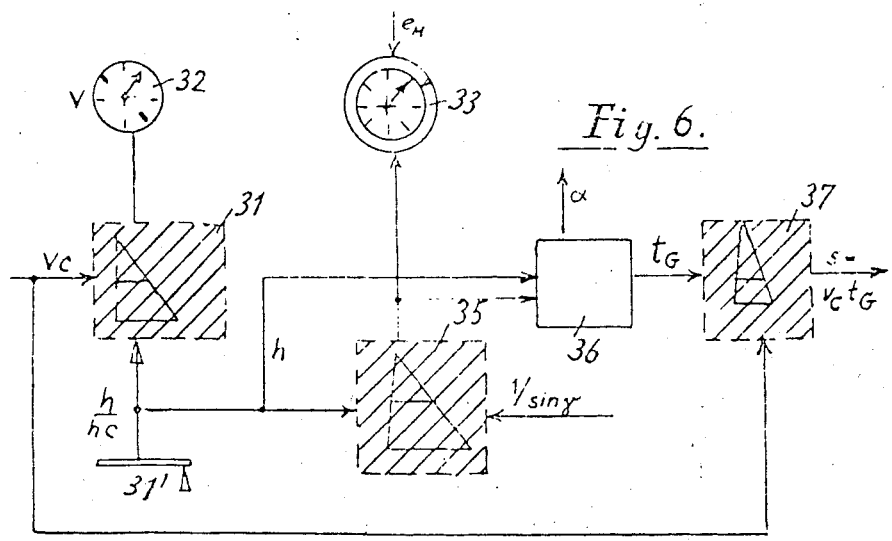
FIG. 6 shows diagrammatically the target travel from the time the gun is fired until the projectile reaches the point of impact.

The third computer group serves for the computation of the ballistic values and the distance $s = v_ct_G$ traveled by the target within the period $t_G$ calculated from the time the gun is fired until the projectile hits the target. The schematic arrangement is shown in FIG. 6.

The target speed $v_c$ goes into the multiplier 31 in which it is multiplied by the unknown conversion factor $h/h_c$, which may be preset e.g. at the handwheel 31'; as a result, the estimated value of the true target speed appears at the indicator device 32. If the target range $e_M$ is known from a radar or other range finder and indicated at the dial 33, estimation of the target speed becomes unnecessary. The speed is obtained inherently if the functional value $1/\sin\gamma$ determined in the input computer FIG. 3 e.g. by a cam disc 100, multiplied in multiplier 35 by the value set in the handwheel 31', equals the range value indicated at the dial 33. For conversion to the values for the true target course, we have either, if the range is unknown, the estimated target speed, through which then also the range is known, or we have the range through which the true target speed is known.

Altitude $h$ and range $e_M$ form in known manner in the ballistic computer 36 the superelevation $\delta$ and the time of trajectory flight of the projectile $t_G$. The superelevation is added to the angle of elevation $\gamma_T$ (not shown), and the time of trajectory of the projectile $t_G$ is multiplied by the speed $v_c$ in the multiplier 37. The product is the target course between present and future positions $s$ which enters in the computer group of FIG. 5 as input value through differential 23 into the computer for the values of the point of impact $\delta_T$ and $\gamma_T$.

Figure 7:
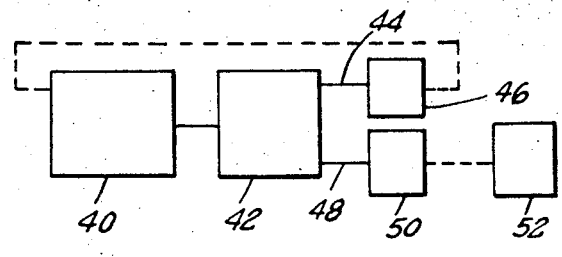
FIG. 7 is a block diagram of the apparatus of the present invention.

A block diagram of the present invention is shown in FIG. 7 and it is noted that the elements are all conventional. Sighting means 40 is connected with computer means 42 which comprises the apparatus of FIGS. 3, 5, and 6. One output 44, corresponding to outputs from 16 and 19 in FIG. 5, of computer means 42 is connected with motor means 46 which includes motors 16 and 20 of FIG. 5, and another output 48, corresponding to the outputs from 25 and 30 in FIG. 6, is connected to motor means 50 which includes motors 24 and 27 of FIG. 6. Motor means 50 moves a weapon such as an anti-aircraft gun 52 to compensate for superelevation and transit time of a projectile fired therefrom in order to hit the target. Motor means 46 operates to move sighting means 40 so as to provide automatic tracking of the target.

Thus it can be seen that the angle of elevation and the lateral angle obtained from sighting means 40 are utilized through computer means 42 for automatic tracking by moving the sighting means in accordance with motor means 46 and by moving anti-aircraft gun 52 in accordance with motor means 50. This is accomplished without knowledge of the distance of the target from the observation point by representing the parameters on a cotangent plane at a constant height.

I claim:
1. Apparatus for tracking a moving target from an observation point without knowledge of the distance of the target from the observation point comprising
    sighting means for providing sighting signals corresponding to the angle of elevation and the lateral angle of the target from the observation point, the elevational angular velocity of the target and the lateral angular velocity of the target, said sighting signals representing target movement in polar coordinates on a cotangent plane having a constant height;
    first computer means connected with said sighting means for receiving first input signals corresponding to said angle of elevation and said lateral angular velocity and for providing first output signals having a sinusoidal relationship with said first input signal corresponding to said angle of elevation;
    second computer means connected with said sighting means for receiving second input signals corresponding to said angle of elevation and said elevational angular velocity and for providing second output signals having a cotangential relationship with said second input signal corresponding to said angle of elevation;
    third computer means connected with said first computer means and said second computer means and responsive to said first and second output signals to provide third output signals corresponding to target velocity and sight angle in said cotangent plane;
    fourth computer means connected with said second computer means and said third computer means for receiving fourth input signals corresponding to said sight angle and said angle of elevation and for providing an output signal corresponding to a shortest range in the cotangent plane; and
    fifth computer means connected with said third computer means and said fourth computer means for receiving fifth input signals corresponding to said target velocity in said cotangent plane, said sight angle in said cotangent plane and said shortest range in said cotangent plane and for providing output signals corresponding to future angles of elevation and future lateral angles of the target.

2. The invention as recited in claim 1 wherein sixth computer means is connected with said fourth computer means and said sighting means for receiving sixth input signals corresponding to said sight angle and said lateral angle and for providing an output signal corresponding to a course angle; seventh computer means connected with said third computer means and said sixth computer means for receiving seventh input signals corresponding to said target velocity in said cotangent plane, said sight angle in said cotangent plane, said course angle and said shortest range in said cotangent plane for providing seventh output signals corresponding to a lateral lead angle and a lead angle of elevation with respect to a projectile to be fired at the target; said seventh computer means including correcting means for correcting the signal corresponding to said sight angle in accordance with the transit time of the projectile from the point of observation to the target.

3. The invention as recited in claim 2 wherein said correcting means is connected with eighth computer means, said eighth computer means including means for providing eighth output signals corresponding to said transit time and said angle of elevation from eighth input signals corresponding to the true height of the target and said target velocity in said cotangent plane.

4. The invention as recited in claim 2 wherein said correcting means is connected with eighth computer means, said eighth computer means including means for providing eighth output signals corresponding to said transit time and said angle of elevation from signals corresponding to true target distance and a function of said angle of elevation.

References Cited

UNITED STATES PATENTS

| | | | |
|---|---|---|---|
| 2,476,746 | 7/1949 | Libman | 235—61.5 |
| 2,577,785 | 12/1951 | Lyon | 33—49 |
| 2,773,643 | 12/1956 | Teiling | 235—61.5 |
| 2,928,593 | 3/1960 | Crooke | 235—61.5 |
| 2,996,244 | 8/1961 | Kissin | 235—61.5 |
| 3,024,536 | 3/1962 | Kuhlenkamp | 33—49 |
| 3,091,035 | 5/1963 | Kuhlenkamp | 33—49 |
| 3,277,282 | 10/1966 | Kuhlenkamp | 33—49 |

MALCOLM A. MORRISON, *Primary Examiner.*

ROBERT W. WEIG, *Assistant Examiner.*